Dec. 4, 1956 J. M. CARGILL ET AL 2,772,484
SQUARENESS-OF-FACE GAGE
Filed June 24, 1955 2 Sheets-Sheet 2

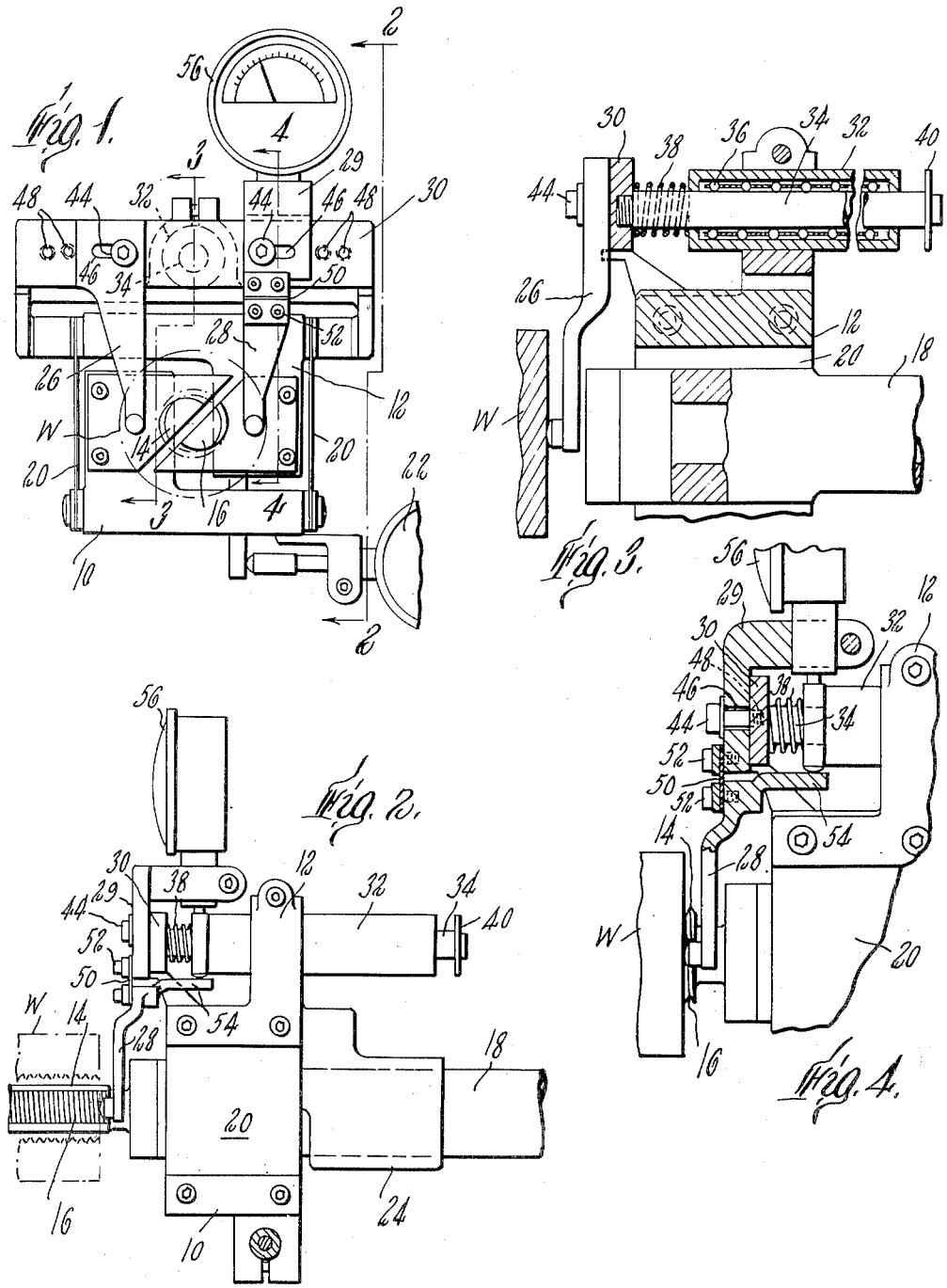

United States Patent Office 2,772,484
Patented Dec. 4, 1956

2,772,484
SQUARENESS-OF-FACE GAGE

Jeffrey M. Cargill, Weathersfield Bow, and Hugh M. Taft, Springfield, Vt., assignors to Bryant Chucking Grinder Company, Springfield, Vt., a corporation of Vermont Application June 24, 1955, Serial No. 517,862

7 Claims. (Cl. 33—180)

This invention relates to gages for measuring squareness-of-face of workpieces, and more particularly, to a novel gage for measuring the squareness of the end face of a workpiece while simultaneously gaging a longitudinal surface thereof.

Gages for measuring the squareness of the end face of a threaded workpiece while simultaneously gaging the diameter thereof are known to the art, such being shown and described in U. S. Patent 2,427,152. In the gage therein described, however, although the overlying swinging arm squareness-of-face gaging structure is entirely suitable from the standpoint of accuracy, it is not only inconvenient to use because of the necessity of swinging it into gaging position overlying the workpiece in order to measure the squareness-of-face of each workpiece, but also because its measurement of run-out is expressed in terms of the diametric distance between its squareness-of-face gage elements.

Accordingly, it is an object of the present invention to provide a gage having a novel squareness-of-face gage element structure whereby complete inspection of a workpiece, including the diameter thereof as well as the squareness of the end face thereof relative to its axis, may be carried out without the necessity of swinging a squareness-of-face gaging structure into gaging position. Furthermore, its indication is in terms of radius, rather than diameter.

It is a feature of the invention that the gage structure provided is simple and rugged, as well as being highly accurate. Furthermore, the structure of the invention may readily be applied to existing gages, and is easily and quickly modified for various types of gaging operations, either internal or external, and for threaded as well as for smooth cylindrical workpieces.

For a complete understanding of further objects and features of this invention, reference is made to the following description of a preferred embodiment thereof when read together with the accompanying drawings, wherein:

Fig. 1 is a plan view of the gage of the invention;

Fig. 2 is a side view of the gage of Fig. 1 taken on the line 2—2 thereof;

Fig. 3 is a cross-sectional side view of the gage of Fig. 1 taken on the line 3—3 thereof;

Fig. 4 is a cross-sectional side view of the gage of Fig. 1 taken on the line 4—4 thereof;

Figure 5:
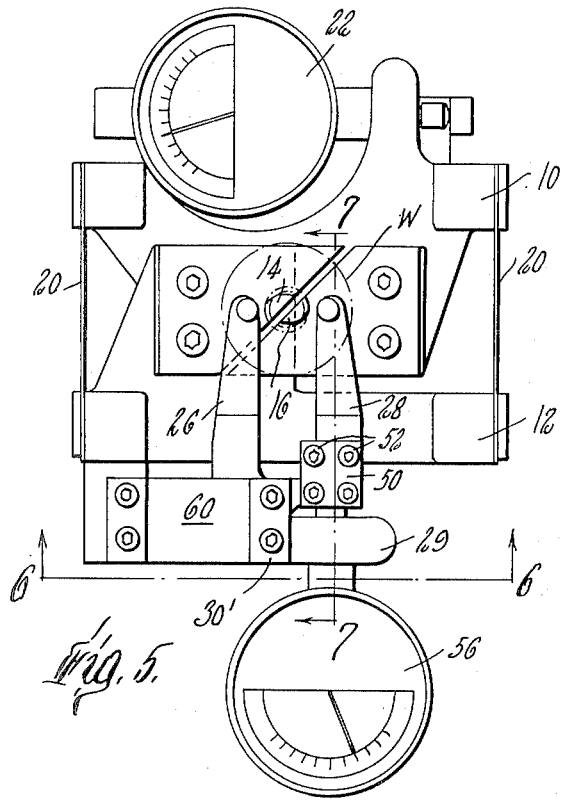
Fig. 5 is a plan view of a modified form of the gage of the invention.

Referring to the drawings, at 10 and 12 are shown two relatively movable support members having upper pad surfaces for supporting removable threaded gage elements 14 and 16 thereon, said support member 10 having a longitudinally extending hollow handle 18 and support member 12 being movable relative thereto. The support members are supported for movement in a direction toward and away from one another for engagement of the upstanding thread gage elements with the thread (as shown, internal) of a threaded workpiece W by means of reeds 20 mounted on the support members, and connecting the ends of support members 10 and 12. These reeds 20 are of substantial width to afford substantial resistance to relative motion of the members longitudinally of the axis of the gage elements 14 and 16 but permitting the gage elements to be moved toward and away from one another in a substantially rectilinear direction.

A leaf spring (not shown) is housed within the hollow handle 18, one end of this spring being supported at the lower end of said handle and the other end engaging the other support member 12; intermediate the ends of the spring it bears against a fulcrum on the inner surface of the handle 18. With this arrangement, the spring urges the movable support member 12 relatively to the fixed support member 10, in the direction required to move the gage elements into gaging position against the workpiece W. A dial indicator 22, mounted on support member 10 with its actuating plunger bearing against relatively movable support member 12, is used in the usual manner to indicate variations in the displacement of gage elements 14 and 16 from that of a standard ring setting.

The gage may be operated to permit placing of the threaded workpiece W thereon by pressing upon a fingerpiece 24 projecting downwardly from the movable support member 12. During this movement, the support members with their gage elements are pressed toward each other to allow clearance enough for the internal threads of the workpiece to pass over the threads of the gage elements. The fingerpiece is then released so that the gage elements engage the threads of the workpiece, as urged by the spring, the dial indicator then indicating the variation in diameter of the workpiece from that of a standard ring. The above elements being fully shown and described in Gates et al., U. S. Patent No. 2,588,820, will not herein be further described.

According to the present invention, a pair of squareness-of-face gage elements 26, 28 are positioned between workpiece W and thread gage support members 10, 12 and are mounted for movement together in a direction perpendicular to the direction of movement of the upstanding gage elements for engagement with the end face of workpiece W adjacent thread gage support members 10, 12. One of said squareness-of-face gage elements 28 is pivotally mounted by a flexible metallic spring strip or reed 50 on its fixed portion 29, so that said element 28 is movable relative to the other element 26, said relative movement being an indication of the run-out of the end face of said workpiece. Thus, as shown in Figs. 1 through 4, a squareness-of-face gage element support member 30 is mounted on thread gage support member 12 for movement relative thereto in a direction perpendicular to the direction of movement of thread gage support members 10, 12. To achieve the desired linear movement, a ball slide mounting is preferably provided. Such mounting comprises a tubular member 32 having mounted therein a rod 34, said rod being supported axially of said tubular member by means of a plurality of balls 36 to provide low friction axial movement of said rod relative to said tubular member. As herein shown, the tubular member 32 is mounted on thread gage element support member 12 and the rod 34 at its upper end on squareness-of-face gage element support member 30. A compression coil spring 38 is interposed between said tubular member 32 and the squareness-of-face gage element support member 30 to urge squareness-of-face gage elements 26, 28 upwardly into contact with the lower face of workpiece W. A stop 40 is provided at the lower end of rod 34 to limit said upward movement.

The squareness-of-face gage element 26, and the fixed portion 29 of element 28 are each mounted on supporting element 30 by means of suitable machine screws 44, slots 46 being provided in said gage elements and a plurality of tapped holes 48 being provided in said supporting elements so that elements 26, 28 may be readily adjusted to a desired spacing, or other elements substituted therefor, according to the workpiece to be gaged. Said squareness-of-face gage element 26 is normally mounted rigidly on its supporting member 30, while the other element 28 is mounted thereon for swinging movement in a plane perpendicular to the direction of movement of the thread gage element supports 10, 12 by means of its flexible metallic spring strip or reed 50, said reed being mounted on both the stationary support portion 29 of said latter gage element and the long arm of said movable gage element 28 itself by suitable screws 52. Thus, any run-out of the face of a workpiece W will cause pivotal movement of the pivotally mounted squareness-of-face gage element 28.

To indicate the amount of said pivotal movement, a bell-crank structure is provided wherein the element 28 forms the long arm, and a short arm 54 integral therewith extends downwardly from the vicinity of its pivotal mounting, such short lever arm being of one half the lever arm length of the long arm so that the movement of the end of said short arm will be equal to the radial run-out relative to the axis of the workpiece. A dial indicator 56 is mounted in fixed position on the support 30 by means of a suitable clamp on fixed gage element support portion 29 and its actuating plunger engages short bell-crank arm 54 to indicate directly the radial run-out.

Figure 7:
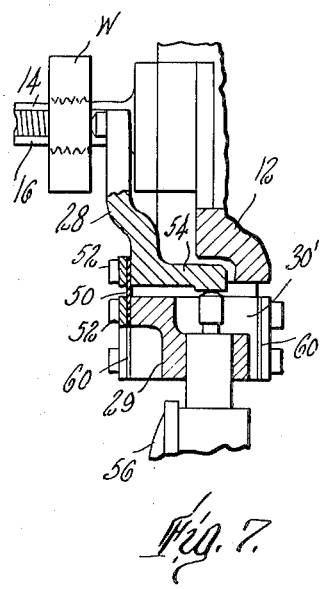
Fig. 7 is a cross-sectional side view of the gage of Fig. 5 taken on the line 7—7 thereof.
Figure 6:
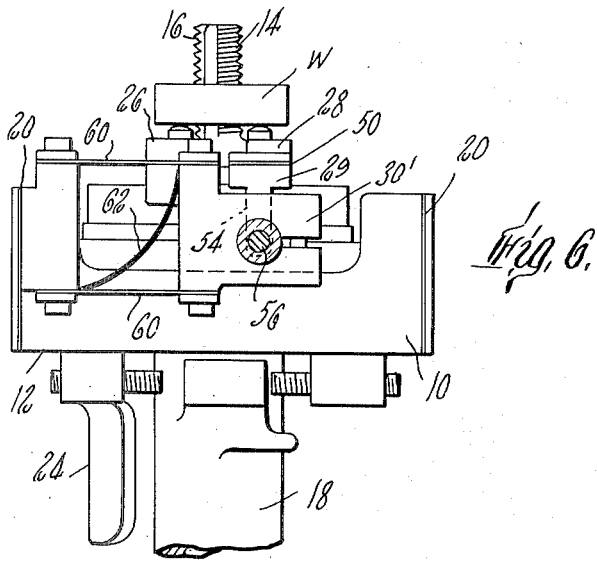
Fig. 6 is a side view of the gage of Fig. 5 taken on the line 6—6 thereof.

The modified gage structure of Figs. 5-7 is generally similar to that above described except in the mounting of the squareness-of-face gage element support member 30' on the thread gage element support member 12. In this simpler arrangement, a pair of spaced parallel metallic spring strips or reeds 60 are mounted between said supports 12 and 30' to provide substantially linear movement of the squareness-of-face gage element support member 30' relative to thread gage element support 12 in a direction perpendicular to the direction of relative movement of the thread gage element supports 10, 12. A leaf spring 62 is interposed between supports 30' and 12 to urge the squareness-of-face gage elements upwardly into engagement with the lower surface of a workpiece W.

In the operation of either of the above-described structures, a workpiece is placed on the upstanding threaded gage elements as above described, in position so that its lower surface is engaged by the squareness-of-face gage elements 26, 28, such elements being assembled on the gage in adjusted position so that their radial distances from the axis of the workpiece are equal to each other and to a predetermined radial distance at which it is desired to measure the run-out. A half turn of the workpiece W will then indicate the maximum run-out at such radius, relative to the axis of the workpiece, by moving the pivoted squareness-of-face element 28 relative to the other. Such radial run-out is measured by dial indicator 56 through the movement of bell-crank short arm 54. Axial movement of the workpiece caused by rotating it will not affect the relative movement of squareness-of-face gage elements 26, 28 since such elements will then move together due to the mounting of their support member 30 or 30' for movement relative to the thread gage element support members 10, 12.

It will be understood by those skilled in the gage art that other embodiments of our invention may be effectively employed without departing either from the spirit thereof or the scope of the appended claims.

We claim:

1. A squareness-of-face gage for workpieces having a threaded cylindrical surface and an end surface perpendicular thereto comprising a pair of relatively movable thread gage support members, an upstanding thread gage element mounted on each of said support members for movement toward and away from one another for engagement with the threaded cylindrical surface of a workpiece, a squareness-of-face gage element support mounted on one of said thread gage support members for movement relative thereto in a direction perpendicular to the direction of movement of said upstanding thread gage elements, a pair of squareness-of-face gage elements mounted on said squareness-of-face gage element support and positioned between said workpiece and said thread gage support members for engagement with the end surface of said workpiece adjacent said thread gage support members on opposite sides of the axis thereof, one of said squareness-of-face gage elements comprising an arm rigidly mounted on said squareness-of-face gage element support and the other of said squareness-of-face gage elements comprising an arm pivotally mounted on said squareness-of-face gage element support by flexible metallic strip means for swinging movement between said workpiece and said thread gage support members in a plane perpendicular to the direction of movement of said upstanding thread gage elements, and a dial indicator mounted on said squareness-of-face gage element support and engaging said squareness-of-face gage element mounted for swinging movement, whereby the squareness of the end surface of a workpiece will be indicated upon rotation of a threaded workpiece engaged by the upstanding thread gage elements.

2. A squareness-of-face gage as claimed in claim 1 wherein a flexible metallic strip is provided for pivotally mounting said squareness-of-face gage element for swinging movement.

3. A squareness-of-face gage as claimed in claim 1 wherein said squareness-of-face gage elements are mounted for engagement with the end surface of a workpiece at equal radii from the central axis thereof, and said squareness-of-face gage element mounted for swinging movement comprises a bell-crank having a long lever arm for engaging the end surface of said workpiece and a short lever arm for engagement with said dial indicator, said short lever arm being one-half the length of said long lever arm, whereby the error in flatness of the end surface of said workpiece at said radius from the central axis thereof will be indicated by said dial indicator.

4. A squareness-of-face gage as claimed in claim 1 wherein a pair of parallel flat metallic strips are provided for mounting said squareness-of-face gage element support on said thread gage element support member for substantially linear movement in a direction perpendicular to the direction of movement of said upstanding thread gage elements.

5. A squareness-of-face gage as claimed in claim 1 wherein ball slide means is provided for mounting said squareness-of-face gage element support on said thread gage element support, and spring means is provided for urging said squareness-of-face gage element support with said squareness-of-face elements into contact with the end surface of a workpiece.

6. A squareness-of-face gage for workpieces having a cylindrical surface and an end surface perpendicular thereto comprising a pair of relatively movable gage support members, an upstanding gage element mounted on each of said support members for movement toward and away from one another for engagement with the cylindrical surface of a workpiece, a squareness-of-face gage element support mounted on one of said gage support members for movement relative thereto in a direction perpendicular to the direction of movement of said upstanding gage elements, a pair of squareness-of-face gage elements mounted on said squareness-of-face gage element support and positioned between said workpiece and said gage support members for engagement with the end surface of said workpiece adjacent said gage support members on opposite sides of the axis thereof, one of said squareness-of-face gage elements comprising an arm rigidly mounted on said squareness-of-face gage element support and the other of said squareness-of-face gage elements comprising an arm pivotally mounted on said squareness-of-face gage element support by flexible metallic strip means for swinging movement between said workpiece and said gage support members in a plane perpendicular to the direction of movement of said upstanding gage elements, and a dial indicator mounted on said squareness-of-face gage element support and engaging said squareness-of-face gage element mounted for swinging movement, whereby the squareness of the end surface of a workpiece will be indicated upon rotation of a workpiece engaged by the upstanding gage elements.

7. A squareness-of-face gage for workpieces having a cylindrical surface and an end surface perpendicular thereto comprising a pair of relatively movable gage support members, an upstanding gage element mounted on each of said support members for movement toward and away from one another for engagement with the cylindrical surface of a workpiece, a squareness-of-face gage element support mounted on one of said gage support members for movement relative thereto in a direction perpendicular to the direction of movement of said upstanding gage elements, a pair of squareness-of-face gage elements mounted on said squareness-of-face gage element support for engagement with the end surface of said workpiece adjacent said gage support members on opposite sides of the axis thereof, one of said squareness-of-face gage elements comprising an arm rigidly mounted on said squareness-of-face gage element support and the other of said squareness-of-face gage elements comprising an arm pivotally mounted on said squareness-of-face gage element support by flexible metallic strip means for swinging movement in a plane perpendicular to the direction of movement of said upstanding gage elements, and a dial indicator mounted on said squareness-of-face gage element support and engaging said squareness-of-face gage element mounted for swinging movement, whereby the squareness of the end surface of a workpiece will be indicated upon rotation of a workpiece engaged by the upstanding gage elements.

References Cited in the file of this patent
UNITED STATES PATENTS

| | | |
|---|---|---|
| 2,427,152 | Moore | Sept. 9, 1947 |
| 2,630,633 | Webb | Mar. 10, 1953 |
| 2,700,224 | Johnson | Jan. 25, 1955 |